(12) United States Patent
Raaz (10) Patent No.: US 9,108,800 B2
(45) Date of Patent: Aug. 18, 2015

(54) CONVEYOR BELT SYSTEM AND CONVEYOR BELT

(75) Inventor: Viktor Raaz, Bochum (DE)

(73) Assignee: ThyssenKrupp Industrial Solutions AG, Essen (DE)

(*) Notice: Subject to any disclaimer, the term of this patent is extended or adjusted under 35 U.S.C. 154(b) by 0 days.

(21) Appl. No.: 14/124,852

(22) PCT Filed: Jun. 6, 2012

(86) PCT No.: PCT/EP2012/060765
§ 371 (c)(1),
(2), (4) Date: Jan. 14, 2014

(87) PCT Pub. No.: WO2012/168337
PCT Pub. Date: Dec. 13, 2012

(65) Prior Publication Data
US 2014/0116855 A1 May 1, 2014

(30) Foreign Application Priority Data
Jun. 8, 2011 (DE) .......................... 10 2011 050 936

(51) Int. Cl.
*B65G 15/36* (2006.01)
*B65G 15/40* (2006.01)
*B65G 15/08* (2006.01)

(52) U.S. Cl.
CPC .............. *B65G 15/08* (2013.01); *B65G 15/36* (2013.01); *B65G 15/40* (2013.01)

(58) Field of Classification Search
USPC ............. 198/819, 823, 824, 825, 844.1, 847
See application file for complete search history.

(56) References Cited

U.S. PATENT DOCUMENTS

| 722,041 | A | * | 3/1903 | Plummer ...................... 198/847 |
| 3,368,866 | A | | 2/1968 | Seguela |
| 4,280,620 | A | | 7/1981 | Baker, Jr. |
| 4,760,913 | A | * | 8/1988 | Tschantz ...................... 198/819 |
| 4,819,791 | A | * | 4/1989 | Melander ...................... 198/818 |
| 5,080,221 | A | * | 1/1992 | Steinkotter ...................... 198/819 |
| 5,232,084 | A | * | 8/1993 | Simonsen et al. ............ 198/819 |
| 5,460,261 | A | * | 10/1995 | Kusel et al. ................... 198/819 |
| 6,029,801 | A | * | 2/2000 | Odin et al. ..................... 198/847 |

(Continued)

FOREIGN PATENT DOCUMENTS

| DE | 2831741 A1 | 2/1979 |
| DE | 19608371 A1 | 9/1997 |

(Continued)

*Primary Examiner* — Douglas Hess
(74) *Attorney, Agent, or Firm* — Laurence A. Greenberg; Werner H. Stemer; Ralph E. Locher (57) ABSTRACT

A conveyor belt system includes a conveyor belt extending in a longitudinal direction and a plurality of support roller stations disposed at a distance from each other in the longitudinal direction and on which the conveyor belt is supported by support rollers. The conveyor belt is formed from a flexible base material and a plurality of unconnected traction devices which determine the tensile strength or rigidity of the conveyor belt and which extend in the longitudinal direction. As seen in the cross-section of the conveyor belt and with respect to a desired position on a central belt section supported on a support roller of the support roller station, the tensile strength or rigidity relative to the belt width is less than on laterally adjoining belt sections which are not supported in the desired position by a support roller. A conveyor belt is also provided.

11 Claims, 9 Drawing Sheets

(56) References Cited

U.S. PATENT DOCUMENTS

| | | | | |
|---|---|---|---|---|
| 6,540,069 | B2 * | 4/2003 | Tschantz | 198/844.1 |
| 7,261,203 | B2 * | 8/2007 | Mindich | 198/819 |
| 7,726,468 | B2 * | 6/2010 | Brunone | 198/819 |
| 7,942,259 | B2 * | 5/2011 | Steven et al. | 198/819 |
| 8,240,463 | B2 * | 8/2012 | Graber et al. | 198/847 |
| 2010/0018841 | A1 | 1/2010 | Steven et al. | |

FOREIGN PATENT DOCUMENTS

| | | |
|---|---|---|
| DE | 19811412 A1 | 9/1999 |
| EP | 0059947 A1 | 9/1982 |
| EP | 0025442 B1 | 8/1984 |
| EP | 0336385 A1 | 10/1989 |
| GB | 2001281 | 1/1979 |
| JP | 6180708 | 5/1986 |

* cited by examiner

CONVEYOR BELT SYSTEM AND CONVEYOR BELT

BACKGROUND OF THE INVENTION

Field of the Invention

The invention relates to a conveyor belt system with a conveyor belt extending in the longitudinal direction and a plurality of support roller stations spaced apart from each other in the longitudinal direction, on which the conveyor belt is supported by support rollers, wherein the conveyor belt is formed of a flexible base material and a plurality of unconnected traction means that extend in the longitudinal direction and determine the tensile strength and tensile rigidity of the conveyor belt in its longitudinal direction. Also referred to as reinforcing material, the traction means are usually embedded in the base material, and form a base frame, which is also called the casing. Within the framework of the invention, the central alignment of the conveyor belt on the support roller stations in cross section is referred to as the desired position. The subject matter of the invention also relates to a conveyor belt. For example, steel wires or steel ropes can be provided as the traction means, which together comprise the casing. The casing embedded in the flexible base material has no connections or reinforcements in the transverse direction, so that the traction means are unconnected in terms of the invention. In the conveyor belt, the traction means are held in their position by the flexible base material, wherein the casing makes it possible to achieve a good mobility for the conveyor belt in the transverse direction with traction means that extend only Pin the longitudinal direction. In addition, the conveyor belt is easy to manufacture, because only individual traction means extending in the longitudinal direction must be embedded in the base material. Accordingly, the use of corresponding conveyor belts has become popular precisely in large conveyor belt systems.

While the tensile strength indicates the stress at the maximum achieved tensile force in a tensile test, the tensile rigidity is a measure for elastic strain given a change in tensile force. In relation to a stress-strain diagram, the tensile rigidity corresponds to the functional correlation between stress and strain, while the tensile strength only represents a maximum value. In a linear progression, the tensile rigidity corresponds to the modulus of elasticity. The elastic strain energy corresponds to the integral for the tensile rigidity over the respective strain. Both the tensile strength and tensile rigidity must be taken into account when selecting traction means for conveyor belts. Belt manufacturers have established a belt width-related strength as a parameter. The belt rigidity is here indicated by the percentage strain at 10% or 20% of the strength value, and just as the strength, can be converted into a belt width-related parameter, i.e., a parameter standardized in relation to the width.

Conveyor belt systems are used for transporting a wide variety of bulk materials, such as waste material, mineral ores, combustibles, building materials or the like. The conveyor belts here often take the form of a trough on support rollers standing perpendicular to the conveying direction, or are moulded into a tube and run through support roller stations with several annularly arranged support rollers.

According to the general structural design, the conveyor belt exhibits a base material and a casing with traction means, which convey the tensile force and usually take the form of textile or steel rope inlays. Viewed in the cross section of the conveyor belt, these traction means are usually distributed uniformly over the conveyor belt width.

However, there are also known conveyor belts that have belt sections with varying belt width-related tensile rigidity viewed in cross section over the width owing to a change in the density of traction means and/or a change in configuration for the individual traction means.

Known from U.S. Pat. No. 3,368,664 is a conveyor belt with a casing, which exhibits a structure resembling a fabric or mesh. The casing exhibits tension carriers extending in the longitudinal direction, which are joined together and tensioned by wires extending in the transverse direction. To prevent breakage in the regions between the support rollers, an elevated density of traction means is provided there. However, the connection in the transverse direction is absolutely necessary to achieve the described properties, which yields a very tight braiding in the regions exposed to a higher load. But the elevated transverse connection makes the conveyor belt comparatively stiff there. In particular, it is extremely expensive to manufacture such a conveyor belt, so that the described principle could not find acceptance in practice. In addition, a completely different force distribution arises than for a casing with unconnected traction means, since the transverse connections described in U.S. Pat. No. 3,368,664 can also distribute the longitudinal tensile forces between adjacent traction means. As a consequence, U.S. Pat. No. 3,368,664 discloses a self-supporting casing that is load-bearing in the transverse direction without the elastic material of the conveyor belt.

Known from EP 0 059 947 A1 and EP 0 025 442 B1 are conveyor belts that exhibit unconnected traction means in the form of steel ropes only in a central belt section. The adjoining lateral belt sections are not reinforced, so that the latter can be more easily bent at the edges on support roller stations with a central support roller and two laterally adjacent, inclined support rollers.

Known from DE 28 31 741 A1 is a counter-rotating neck in which the density of traction means increases at the edges of the conveyor belt, i.e., the distance between the individual traction means is reduced. The objective here is to make it easier to mould the central belt section between the belt roller stations into a downwardly sagging U-shape that accommodates the transported material.

Finally known from US 2010/0018841 A1 in a conveyor belt moulded into a tube is to omit traction means a distance away from the lateral edges, so that the overlapping edges of the conveyor belt can there be more easily folded down.

In both a trough-shaped arrangement of the conveyor belt and a tubular arrangement, it is important that the conveyor belt not to be laterally deflected too far out of the desired position, i.e., with the middle of the belt out of the middle of the lower support roller, in both the empty and loaded state. An excessive lateral deflection of the conveyor belt can result both in damage to the conveyor belt and a spillage of material.

Various methods are known in practice to prevent the conveyor belt from excessively deflecting. For example, providing lateral stops is known for a trough-shaped configuration of the conveyor belt. Other than the arrangement of stops increasing the structural outlay, the latter can also damage the conveyor belt, or at least lead to increased wear. Also known is to slightly incline the support rollers or part of the support rollers from the middle of the belt, so that the latter are shaped slightly like an arrow pointing in the direction of movement when viewed from the top. While tilting the rotational axis relative to the transverse direction of the belt can yield a certain centring action, a distinct increase in friction simultaneously arises, significantly elevating both the wear and drive energy required to advance the conveyor belt.

BRIEF SUMMARY OF THE INVENTION

Against this backdrop, the object of the invention is to indicate a conveyor belt system with which the conveyor belt can be reliably centred using simple means.

Proceeding from a conveyor belt system with the features described at the outset, the object is achieved according to the invention by virtue of the fact that, in the conveyor belt cross section and in relation to a desired position, the belt width-related tensile rigidity on a central belt section supported against a respective support roller of the support roller station is less than on laterally adjoining belt sections that are not supported against a support roller in the desired position. The described configuration yields a self-centring action relative to the lateral alignment of the conveyor belt in the support roller stations, which is effective on both straight distances and curved passages. According to the invention, during lateral belt deflections, self-centring forces are generated in the conveyor belt itself proceeding from the desired position by varying the tensile rigidity in a transverse direction, which counteract the deflection.

In this conjunction, the invention is based on the knowledge that the shape of the conveyor belt as viewed in cross section distinctly changes when the conveyor belt is supported against the support roller stations on the one hand, and sags between the support roller stations on the other. While the conveyor belt exhibits a uniform curvature in unsupported regions, i.e., depending on the configuration, a U-shape or, given a closed tube, an oval shape, at least sections of the conveyor belt on the support roller stations abut precisely against the individual support rollers. A significant reshaping thus takes place on these sections supported on the support rollers along the consecutive support roller stations, while the conveyor belt sections situated between the individual support rollers are subject to distinctly less change in terms of their curvature and alignment.

Within the framework of the invention, these belt sections, which are unsupported with the conveyor belt centrally aligned, i.e., in the desired position, are provided with an elevated belt width-related tensile rigidity, while at least one central section, and preferably other belt sections supported against the support rollers in the desired position as well, can be more easily deformed and strained due to a low belt width-related tensile rigidity. The desired position represents a minimum relative to the elastic deformation energy of the traction means, so that the conveyor belt is always forced into the desired position just because its structure is adjusted to the configuration of the support roller station.

This effect underlying the invention manifests itself especially clearly when the support roller stations each exhibit at least three support rollers with a central support roller under the conveyor belt and two support rollers situated laterally thereto. As evident when examining such a conveyor belt system from the side, the lower edge of the conveyor belt formed by the central belt section distinctly sags between the supporting points on the support roller stations, so that the corresponding traction means are there subject to a greater strain. Reducing the belt width-related tensile rigidity precisely in the highly loaded regions abutting against the support rollers makes it easier to reshape the conveyor belt. A sufficient stability is here ensured for the entire conveyor belt by the high belt width-related tensile rigidity on the unsupported regions, which are subjected to distinctly less reshaping.

The varying belt width-related tensile rigidity in the longitudinal direction viewed in cross section on the different belt section can also be achieved by altering the density of traction means and/or by changing out the very traction means. For example, the cross sectional surface of the individual traction means can be varied. However, an especially simple configuration arises in this conjunction when all traction means are identical in design, wherein the belt width-related tensile rigidity is locally modified by changing the density of traction means, i.e., the distance between the individual traction means. Different traction means need then not be provided when manufacturing the conveyor belt. In particular steel wires or steel ropes comprised of several wires are suitable as the traction means. However, other traction means are also conceivable depending on the application, for example ones consisting of natural and/or synthetic materials. The individual sections with varying belt width-related tensile rigidity normally each exhibit several traction means. One possible base material for the conveyor belt is an elastomer, in particular rubber or a plastic similar to rubber.

The configuration of the conveyor belt system according to the invention can be used both in a trough-shaped arrangement of the conveyor belt, or in a conveyor belt closed to form a tube. In a conveyor belt closed to form a tube, an annular arrangement of support rollers is usually provided on the support roller stations.

The conveyor belt can also be conventionally guided in an arc, i.e., along a polygonal line relative to the arrangement of consecutive support roller stations. Even given such a non-straight progression, self-centring relative to the desired position is achieved within the framework of the invention. Given a non-straight progression of the conveyor belt, the term longitudinal direction relates to the conveying direction along the described curve or along the described polygonal line.

In order to improve the running characteristics even further in a conveyor belt closed to form a tube, a balanced tension carrier distribution can be provided. This means that the traction means are arranged in the conveyor belt in such a way that the centre of gravity for all traction means taken together lies roughly in the centre of gravity for the cross sectional surface bordered by the support rollers of a support roller station. In a preferred symmetrical arrangement of support rollers in the support roller station, the centre of gravity for the cross sectional surface bordered by the support rollers lies precisely in the middle of the support roller station, i.e., in the point of intersection between the vertical and horizontal symmetrical axes. Given a horizontal and/or vertical curved progression of the conveyor belt, a balanced tension carrier distribution largely eliminates the components of a destabilizing torque induced by both tensile and gravitational forces, and does not detract from the self-centring properties present according to the invention.

Aside from the self-centring properties, the configuration according to the invention also yields other advantages. The optimized force distribution also results in a reduction of the drive energy necessary for forward motion. The load and wear on the conveyor belt are also reduced accordingly. In addition to extending the service life of the conveyor belt system, consideration can also be given to increasing the distance between the individual support roller stations within the framework of the invention, which yields the potential for significant savings.

The specific configuration of the support roller station is not limited within the framework of the invention. For example, the support rollers of a support roller station can also be offset to a certain extent in the longitudinal direction. In particular given an annular arrangement of support rollers in a conveyor belt closed to form a tube, being offset in a longitudinal direction like this is common, wherein the support rollers of a support roller station are usually arranged in groups spaced apart from each other.

The subject matter of the invention also relates to a conveyor belt, which is especially well suited for the described conveyor belt system.

BRIEF DESCRIPTION OF THE SEVERAL VIEWS OF THE DRAWING

The invention will be explained below based on a drawing that depicts only an exemplary embodiment. Shown on.

DESCRIPTION OF THE INVENTION

Figure 1:
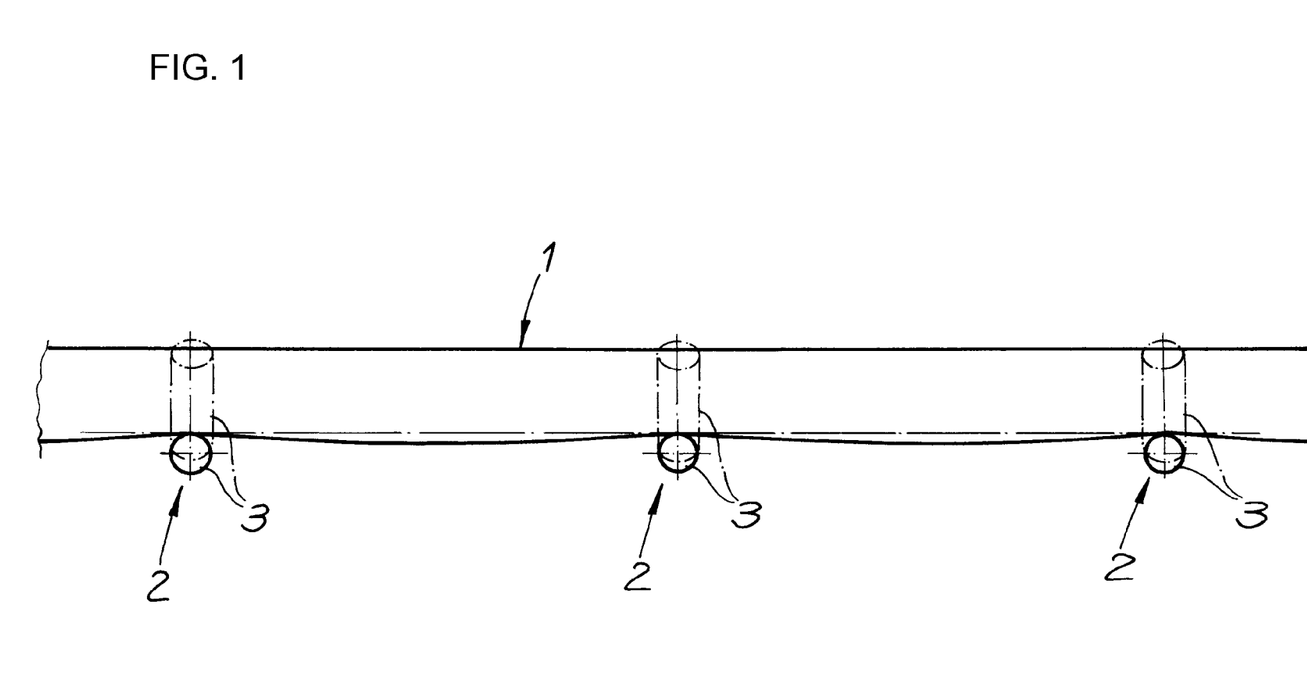
FIG. 1 is a side view of a section of a conveyor belt system with a conveyor belt and support roller stations.

FIG. 1 presents a side view depicting a trough-shaped section of a conveyor belt system with a conveyor belt 1 extending in a longitudinal direction and a plurality of support roller stations 2 spaced apart in the longitudinal direction, against which the conveyor belt 1 is supported on support rollers 3. As evident here, the conveyor belt 1 sags between the support roller stations 2 with its lower edge in relation to the horizontal. The conveyor belt 1 can be designed as a continuously revolving band, wherein the conveyor belt 1 moving back and forth is guided in two planes situated one over the other in an opposite direction. However, only the upper run with the corresponding support rollers 3 is shown for reasons of clarity.

Figure 2A:
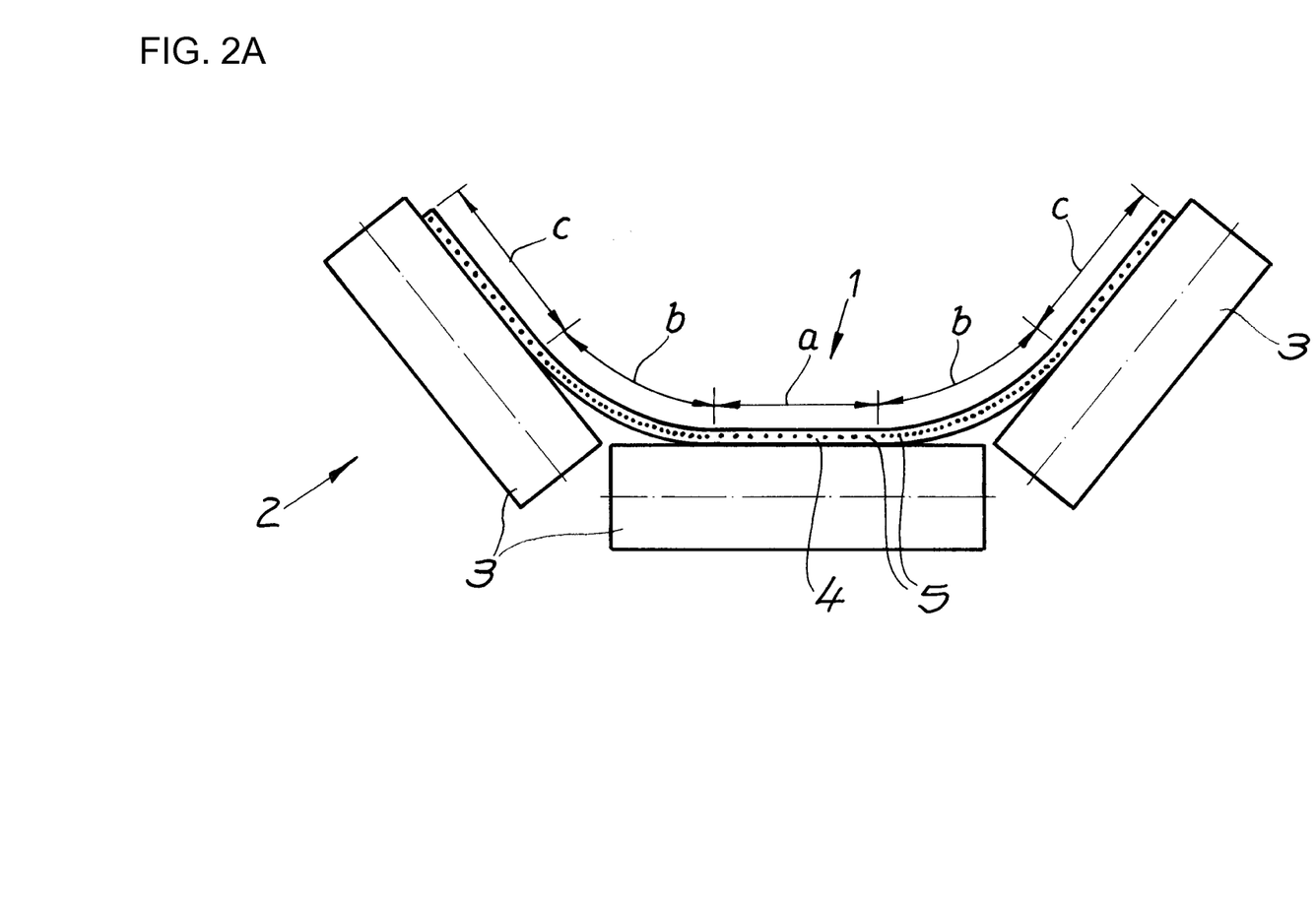
FIG. 2a is a cross section through the conveyor belt system depicted on FIG. 1 in the area of one of the support roller stations, wherein the conveyor belt is situated in a desired position.

For a conveyor belt system according to the invention, FIG. 2a shows a cross section through the conveyor belt 1 in the area of one of the support roller stations 2. As evident, the conveyor belt 1 in the exemplary embodiment shown is shaped like a trough due to the corresponding arrangement of support rollers 3. The conveyor belt 1 consists of a flexible base material 4, for example an elastomer like rubber or a plastic similar to rubber, along with traction means 5, which extend in the longitudinal direction and determine the tensile strength and tensile rigidity of the conveyor belt 1 in the longitudinal direction. The traction means 5 embedded in the base material 4 together form a casing without transverse connections. As a consequence, the mobility of the conveyor belt 1 in the transverse direction is essentially determined by the flexible base material 4.

FIG. 2a also shows that the traction means 5 are provided in the form of steel ropes along the cross section that have a varyingly dense arrangement, i.e., are spaced apart at varying distances from each other.

In the cross section of the conveyor belt 1 and in relation to the central desired position of the conveyor belt 1 shown on FIG. 2a, the invention provides that the belt width-related tensile rigidity on a central belt section a supported against the central support roller 3 is less than on the laterally adjoining belt sections b, on which the conveyor belt 1 in the desired position is not supported against one of the support rollers 3. This is achieved by more tightly arranging the traction means in the unsupported belt sections b. The outer belt sections c supported against the lateral support rollers 3 adjoin in the direction of the outer edge of the conveyor belt, and in turn exhibit a reduced belt width-related tensile rigidity owing to a correspondingly enlarged distance between the individual traction means 5.

As may already be gleaned from a comparative examination of FIG. 1 and FIG. 2a, the conveyor belt 1 is subjected to a higher deformation in the areas supported against the support rollers 3, wherein the traction means of the corresponding belt sections between the individual support roller stations 2 are also subjected to a higher strain.

Figure 3:
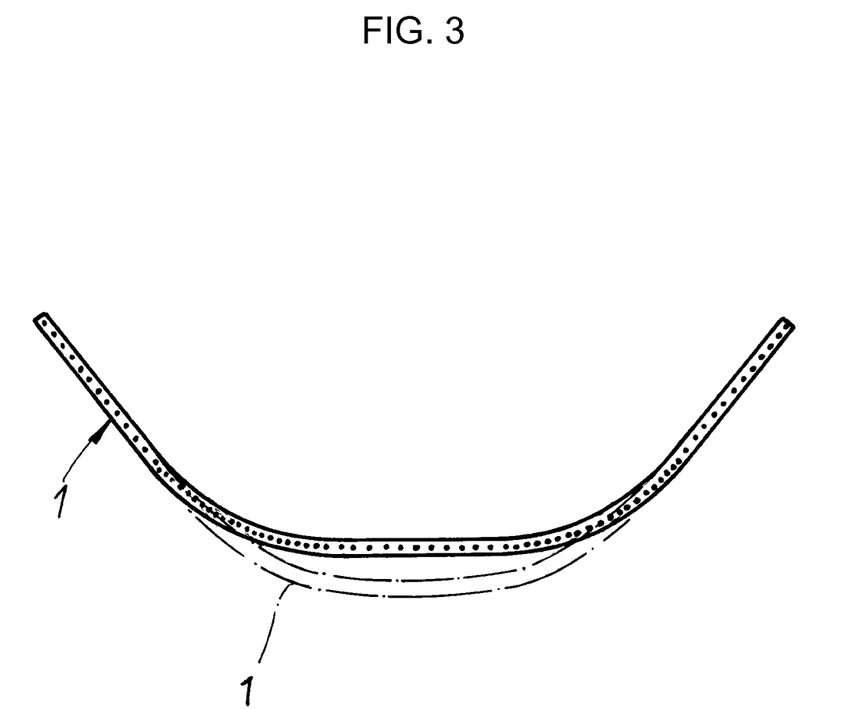
FIG. 3 is a comparison between the position of the conveyor belt in the area of one of the support roller stations on the one hand, and in an area between two consecutive support roller stations on the other.

For further clarification, FIG. 3 shows the progression of the conveyor belt 1 in cross section in the area of one of the support roller stations 2 (solid line) on the one hand, and between two support roller stations 2 (dot and dash line) on the other. While the conveyor belt 1 in the area sagging between two support roller stations 2 assumes a uniform curvature with a U-shape, the support rollers 3 produce a deformation in the area of the support roller station 2, in which at least sections of the conveyor belt 1 flatly abut against the individual support rollers 3.

Figure 2B:
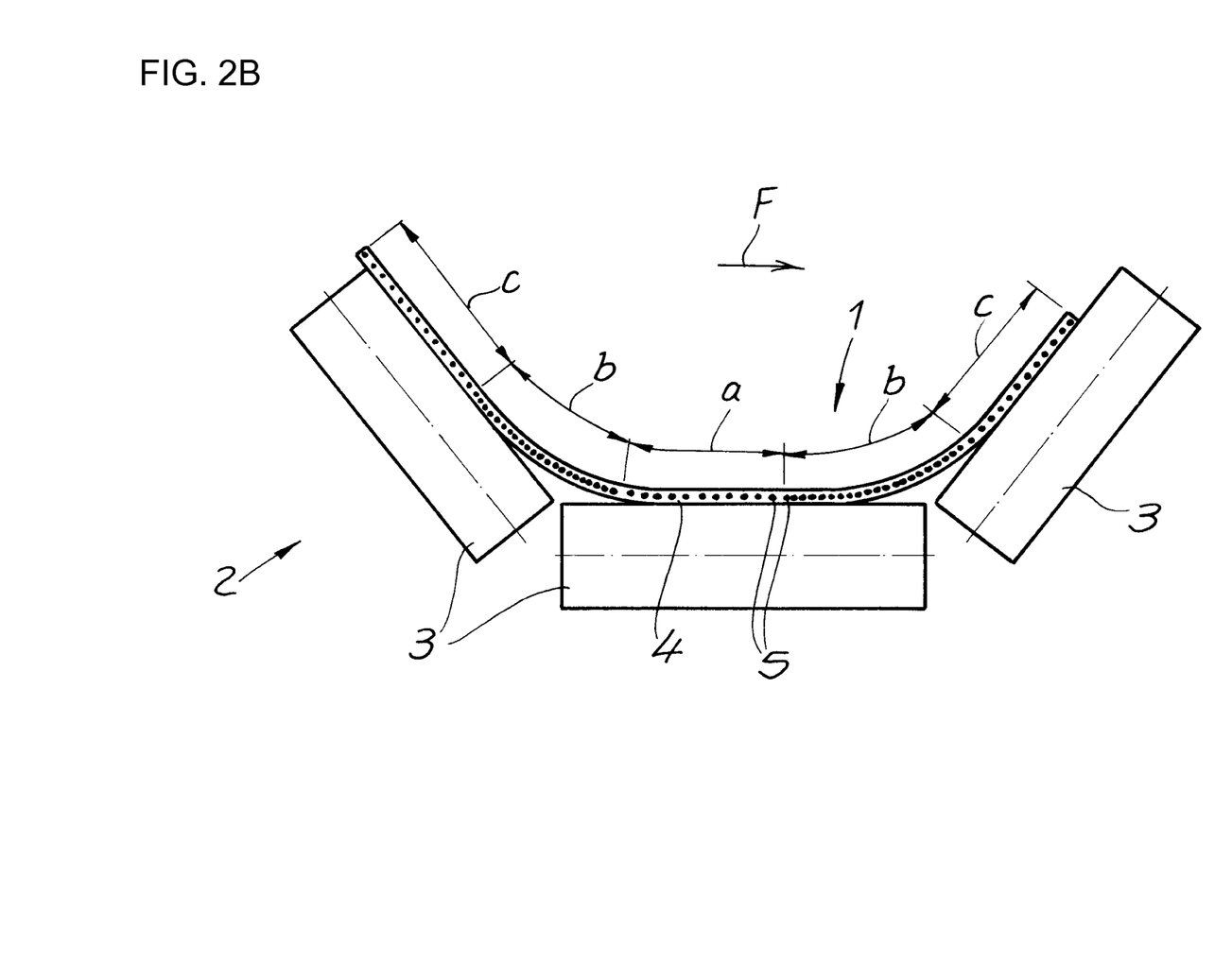
FIG. 2b is the arrangement according to FIG. 2a with a conveyor belt shifted laterally out of the desired position.

As evident from FIG. 3 in this conjunction, the unsupported belt sections b become less deformed relative to the central desired position, and are thus also subjected to less tensile strain. Since precisely these areas exhibit an elevated belt width-related tensile rigidity according to the invention, the desired position is optimal in relation to the force and energy balance, so that a self-centring effect forces the conveyor belt 1 back into the desired position given a lateral deflection. FIG. 2b depicts a corresponding deflection of the conveyor belt 1, wherein the acting restoring forces F are denoted with an arrow.

Figure 4A:
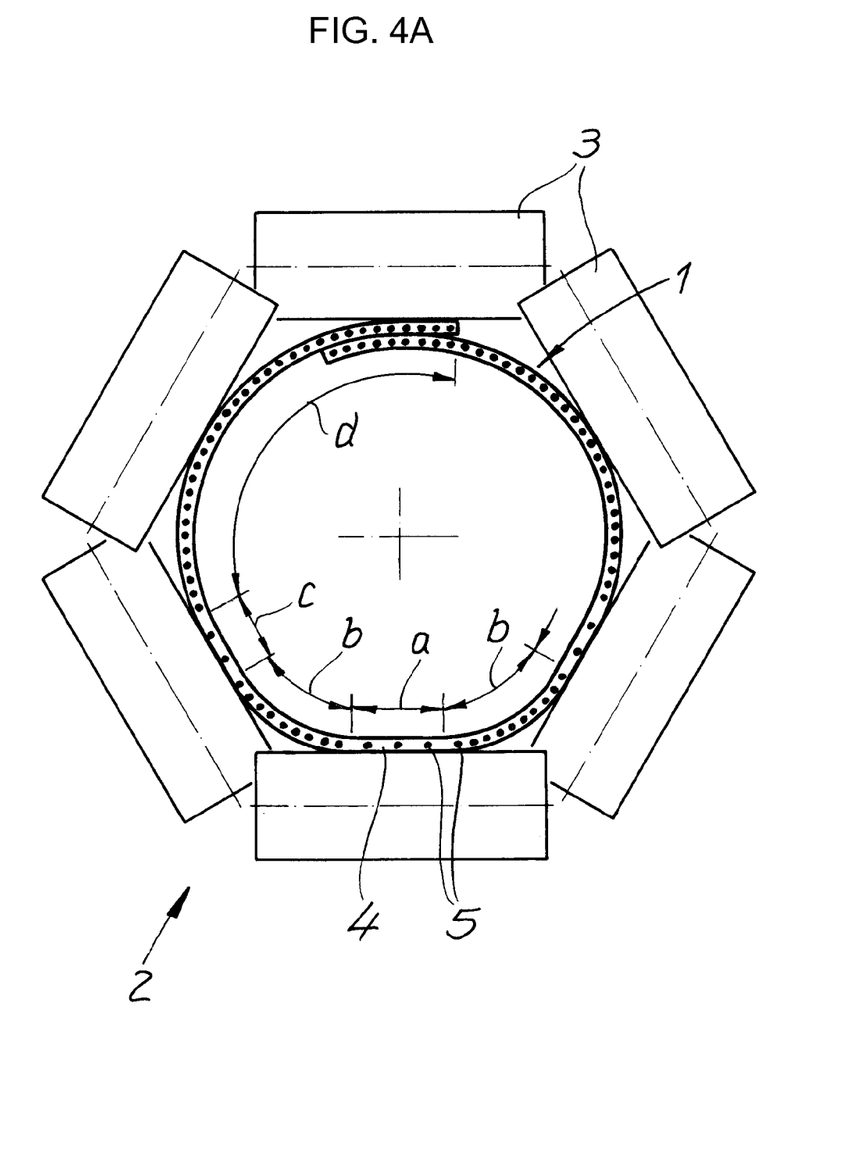
FIG. 4a is a conveyor belt system with a conveyor belt closed to form a tube in a depiction according to FIG. 2a, FIG. 4b is the arrangement according to FIG. 4a with the conveyor belt laterally deflected relative to the desired position.

Within the framework of the invention, the conveyor belt 1 according to FIG. 4a can also be moulded into a tube by annularly arranging the support rollers 3 on the support roller stations 2, wherein the described change in belt width-related tensile rigidity then takes place in the lower area of the conveyor belt 1 moulded into a tube that absorbs the tensile and gravitational forces, wherein a first unsupported belt section b with an elevated belt width-related tensile rigidity and a belt section c in turn supported by one of the lateral support rollers 3 with a reduced belt width-related tensile rigidity adjoin, proceeding from the central belt section a in both directions. By contrast, the end sections d exhibit a uniform distribution of traction means 5, because the conveyor belt is only subjected to comparatively slight load changes.

Figure 4B:
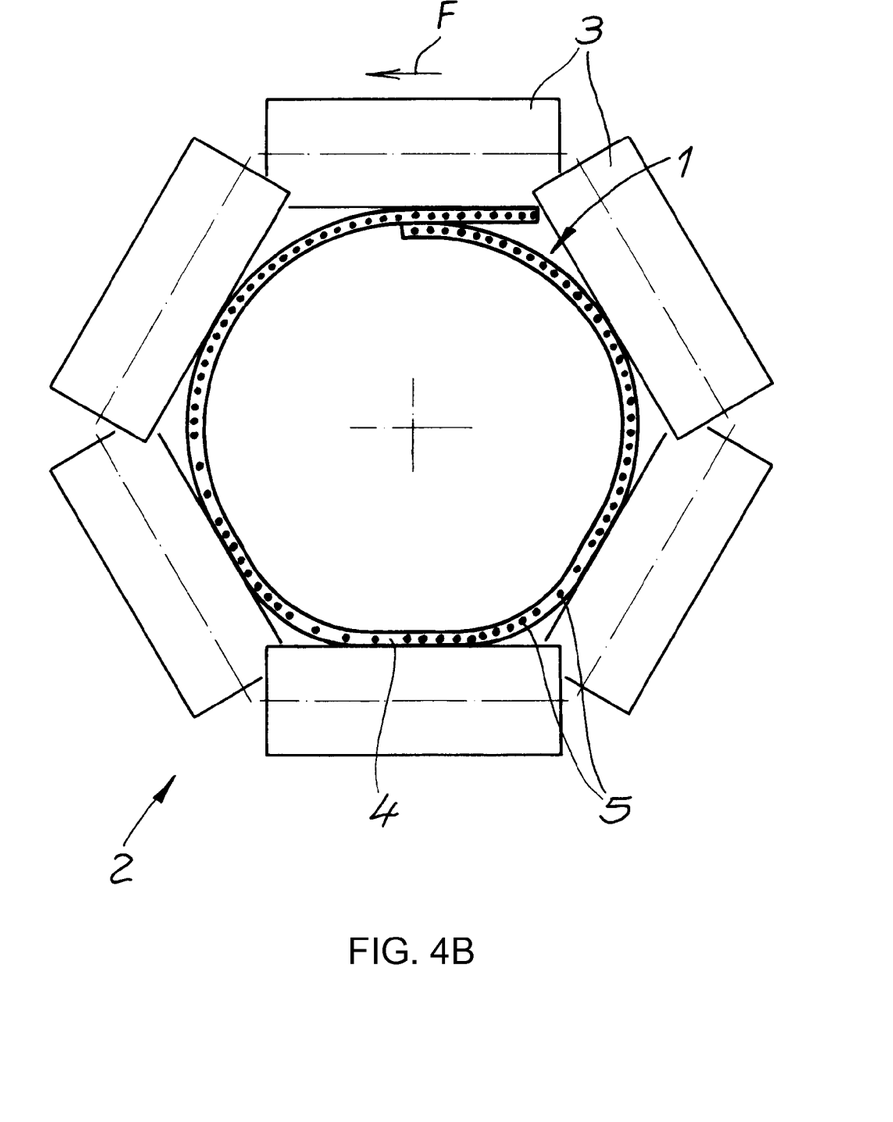

FIG. 4b shows that corresponding restoring forces F compel the conveyor belt 1 to return when deflected from the central desired position, even given such a configuration.

Figure 5A:
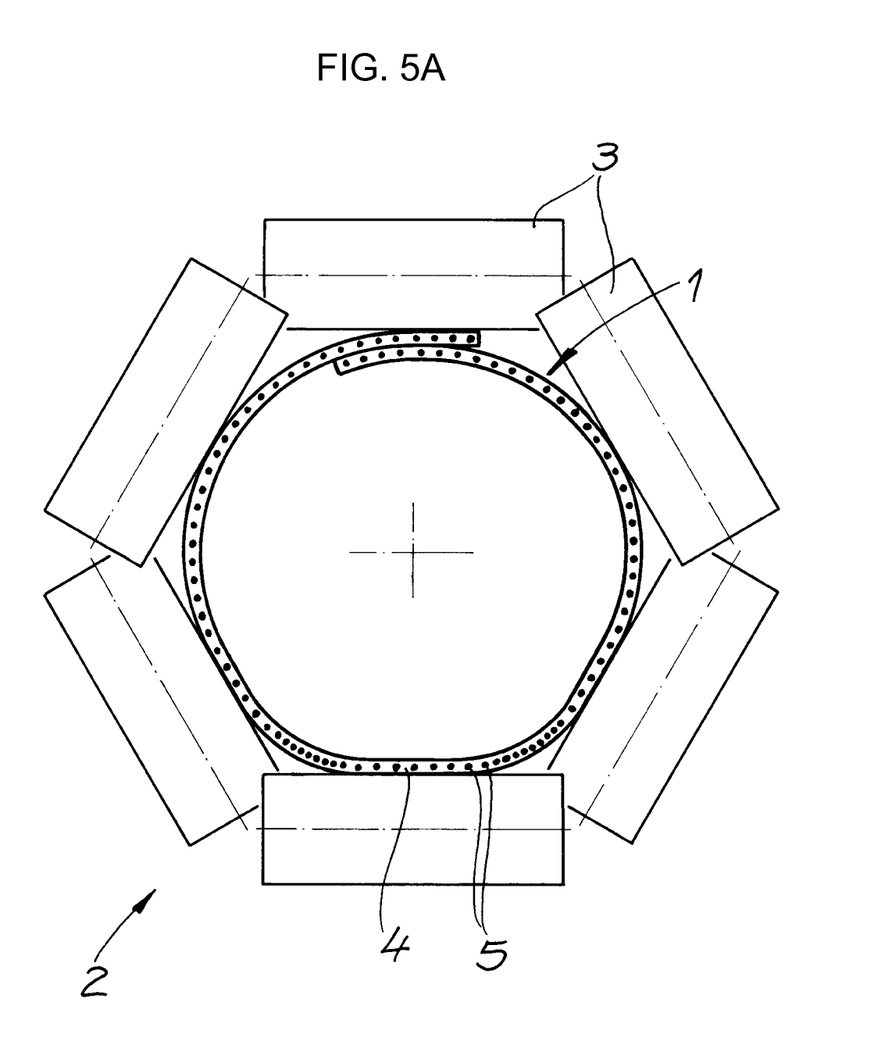
FIG. 5a is an alternative embodiment of the invention with a conveyor belt closed to form a tube in a depiction according to FIG. 4a, FIG. 5b is the arrangement according to FIG. 5a with the conveyor belt shifted relative to the desired position
Figure 5B:
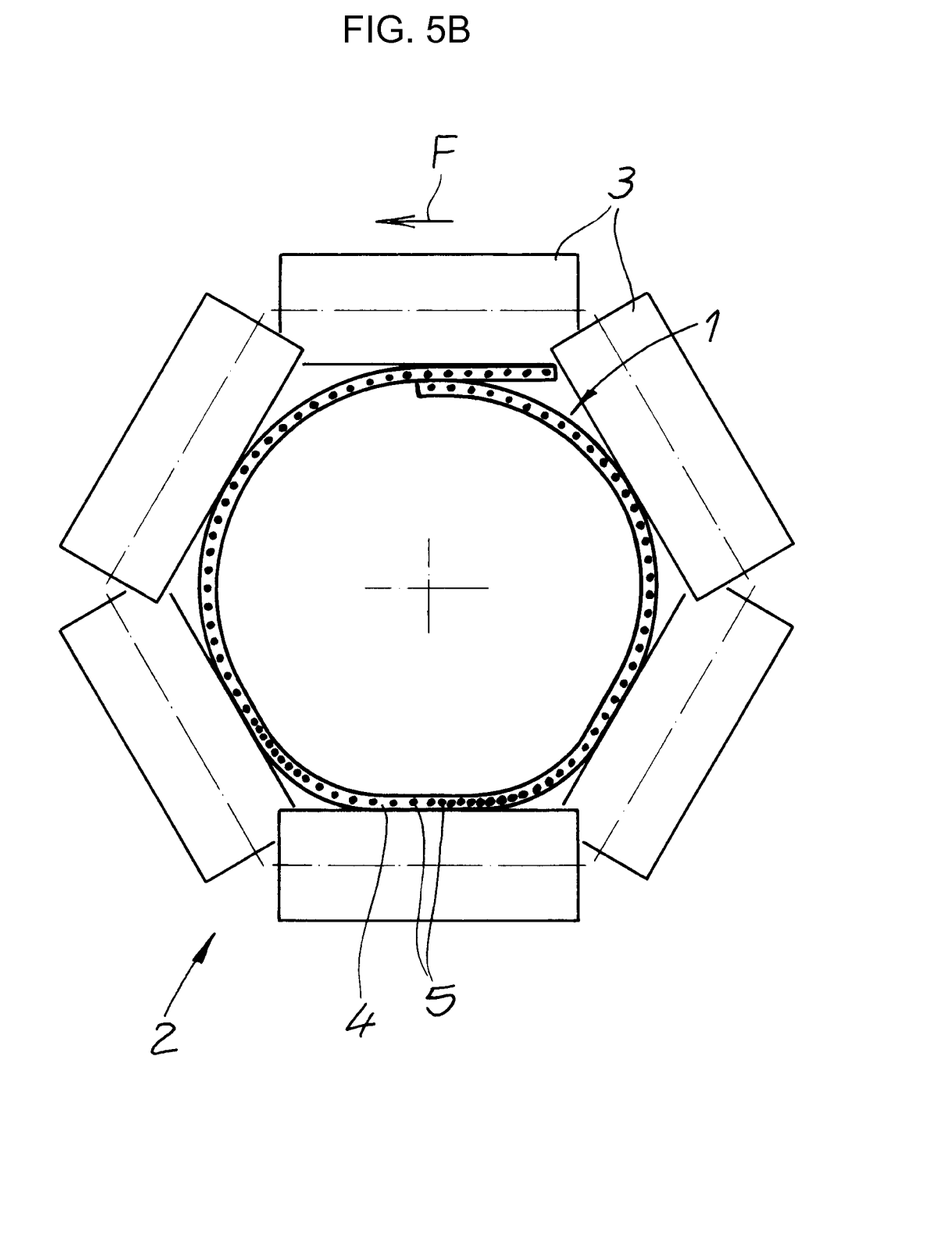
Figure 6:
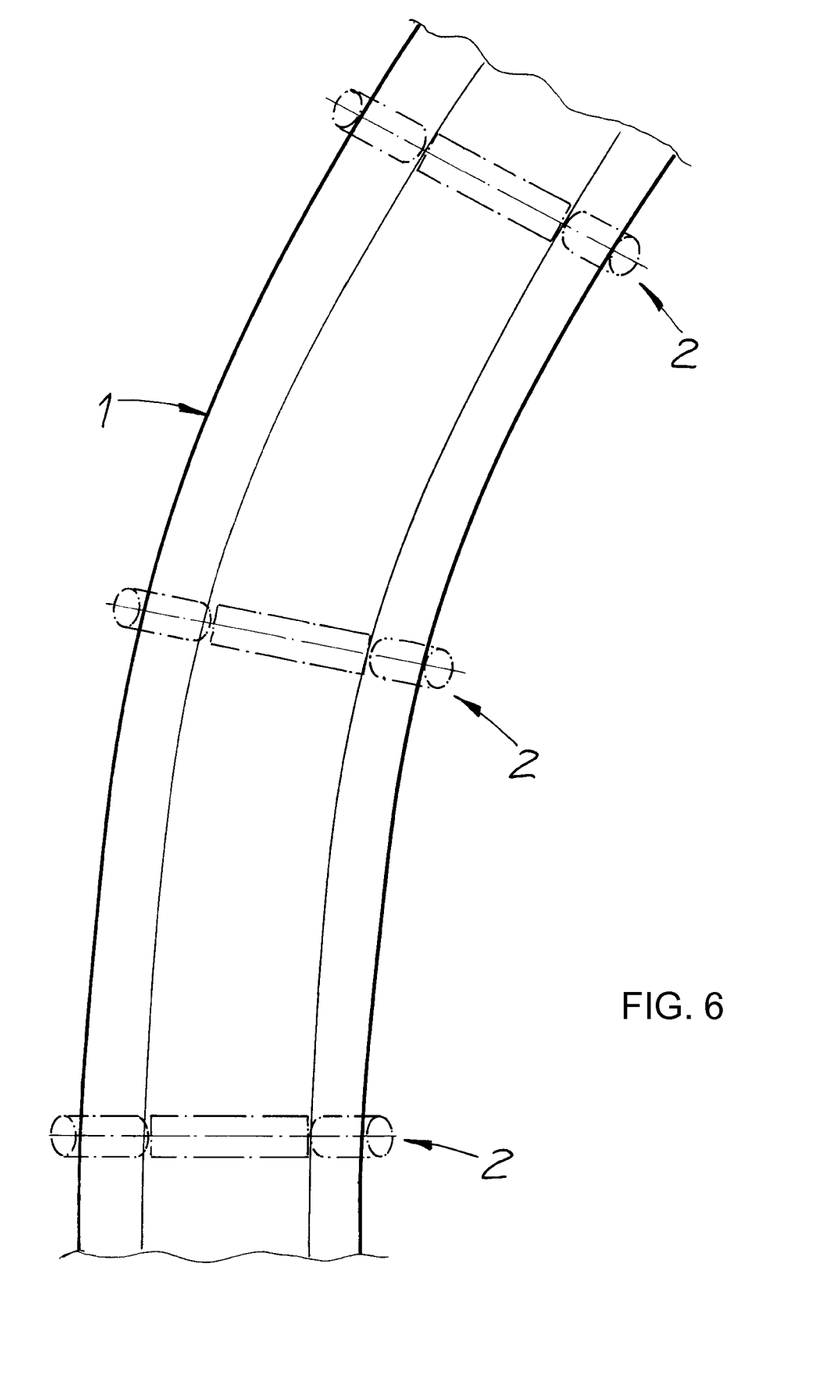
FIG. 6 is a top view depicting a partial length of a conveyor belt system, wherein consecutive support roller stations are arranged along a polygonal line.

FIGS. 5a and 5b show a variant of the conveyor belt system according to the invention corresponding to FIGS. 4a and 4b, in which the conveyor belt 1 moulded into a tube exhibits an altered distribution of traction means 5, wherein the centre of gravity for all traction means 5 taken together lies roughly in the centre of gravity for the cross sectional surface bordered by the support rollers 3 of a support roller station 2. This type of arrangement is also referred to as a balanced tension carrier distribution, and makes it possible to avoid destabilizing torques when guiding the conveyor belt 1 along an arc or along a polygonal line relative to the individual support roller stations 2. Such an arc is shown by example on FIG. 6.

The invention claimed is:

1. A conveyor belt system, comprising:
    a multiplicity of support roller stations spaced apart from each other in a longitudinal direction and having support rollers; and
    a conveyor belt supported by said support rollers, extending in said longitudinal direction and having a belt width and a belt cross section;
    said conveyor belt having a central belt section supported against a respective support roller of said support roller station and belt sections laterally adjoining said central belt section not supported against a support roller in a desired position;
    said conveyor belt formed of a flexible base material and a multiplicity of mutually unconnected traction devices extending in said longitudinal direction and determining a tensile strength of said conveyor belt;
    said tensile strength of said conveyor belt relative to said belt width at said central belt section being less than at said laterally adjoining belt sections in said belt cross section and in relation to said desired position.

2. The conveyor belt system according to claim 1, wherein at least one of a belt density of said traction devices relative to said belt width or an individual cross sectional surface of said traction devices, being less at said central, supported belt section than at said laterally adjoining belt sections.

3. The conveyor belt system according to claim 1, wherein:
    said support roller stations each have at least three respective support rollers including a central support roller situated underneath said conveyor belt and two support rollers situated laterally to said central support roller;
    said belt sections supported on said support rollers in said desired position having a lower tensile strength relative to said belt width than said respective unsupported belt sections between said central support roller and one of said laterally situated support rollers.

4. The conveyor belt system according to claim 1, wherein said conveyor belt is formed into a closed tube by an annular placement of said support rollers on said support roller stations.

5. The conveyor belt system according to claim 4, wherein said traction devices situated in said conveyor belt are configured to cause the center of gravity for all of said traction devices taken together to lie substantially in the center of gravity for a cross-sectional surface bordered by said support rollers of a support roller station.

6. The conveyor belt system according to claim 1, wherein said support roller stations are consecutively disposed along a polygonal line extended at least along a partial length of the conveyor belt system.

7. A conveyor belt, comprising:
    a longitudinal direction, a belt width and a belt cross section;
    a flexible base material;
    mutually unconnected traction devices extended in said longitudinal direction and determining a tensile strength of the conveyor belt; and
    belt sections disposed in said cross section and having varying tensile strength relative to said belt width caused by at least one of a change in density of said traction devices relative to said belt width or an individual change in configuration of said traction devices;
    said belt sections including a central belt section, first belt sections each adjoining and following said central belt section in a respective direction and second belt sections each adjoining and following a respective one of said first belt sections in a respective direction, said first belt sections having a greater tensile strength relative to said belt width than said central belt section and said second belt sections.

8. The conveyor belt according to claim 7, wherein said base material is an elastomer.

9. The conveyor belt according to claim 7, wherein said base material is a plastic similar to rubber.

10. The conveyor belt according to claim 7, wherein said traction devices are steel wires or steel ropes.

11. The conveyor belt according to claim 7, wherein all of said traction devices are identical, and said density of said traction devices relative to said belt width is elevated in said first sections having said greater tensile strength relative to said belt width.

* * * * *